United States Statutory Invention Registration [19]

[11] Reg. Number: H513

Dunne et al. [43] Published: Aug. 2, 1988

[54] ECM PREPROCESSOR OR TRACKER USING MULTI-PROCESSOR MODULES

[75] Inventors: Timothy Dunne, Baltimore; James F. Gentry, Glen Burnie, both of Md.

[73] Assignee: The United States of America as represented by the Secretary of the Air Force, Washington, D.C.

[21] Appl. No.: 880,242

[22] Filed: Jun. 30, 1986

[51] Int. Cl.[4] ..... G01S 13/00

[52] U.S. Cl. ..... 364/516; 342/14; 364/900

[58] Field of Search ..... 364/200, 900, 516; 342/13-19

[56] References Cited

U.S. PATENT DOCUMENTS

| | | | |
|---|---|---|---|
| 3,764,999 | 10/1973 | Simons et al. | 342/12 |
| 3,943,515 | 3/1976 | Miley | 342/17 |
| 4,025,920 | 5/1977 | Reitboeck et al. | 342/13 |
| 4,146,892 | 3/1979 | Overman et al. | 342/13 |
| 4,209,835 | 6/1980 | Guadagnolo | 342/13 |
| 4,217,580 | 8/1980 | Lowenschuss | 342/13 |
| 4,302,818 | 11/1981 | Niemann | 364/200 |
| 4,369,445 | 1/1983 | Evans et al. | 342/17 |
| 4,586,046 | 4/1986 | Pringle et al. | 342/14 |

*Primary Examiner*—Stephen C. Buczinski
*Assistant Examiner*—Linda J. Wallace
*Attorney, Agent, or Firm*—Bernard E. Franz; Donald J. Singer

[57] ABSTRACT

The tracking apparatus uses multi-processor modules for predicting in real time the parametric behaviour of radar signals to be jammed, as part of an electronic countermeasures system. The tracker system is partitioned into three board (module) types—(1) a subsystem request handler, which transfers data from system buses to the tracker system, (2) one or more multi-processor modules (each including a parameter memory and three arithmetic units with micro-sequencers) which does the actual track operation yielding the prediction data, and (3) a vector buffer module, which transfers the completed prediction data onto the buses for the receiver and transmitter. The system computer transfers to the tracker the necessary parameter information (latest time of arrival, threat type (stable, stagger, agile, etc.), angle of arrival, etc.) and initiates a track loop. Central to the operation of the trackers is the parameter memory which is divided conceptually into two main parts: pattern and parameters. The parameter portion of the memory is subdivided into blocks, each dedicated to a particular threat. The defining parameters for that threat are passed from the CPU just before a tracker is started. Also stored as part of this parameter block will be a word providing starting addresses for the type of calculation (stable, agile, stagger, etc.) to be run for that parameter.

1 Claim, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PREPROCESSOR MODULE ARCHITECTURE

ECM PREPROCESSOR OR TRACKER USING MULTI-PROCESSOR MODULES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an ECM (Electronic Countermeasures) preprocessor or tracker of signal emissions, including radar, using multi-processor modules.

Prior power management systems for electronic warfare signal processing have a relatively slow information processing pipeline in which data is sensed, then evaluated, a reaction chosen, the chosen reaction formulated and finally the environment stimulated by ECM transmission. Essentially the pipe is a U-shaped structure as shown in FIG. 1. To accommodate required system functions, bridges between input and output chains to provide functions such as predictive tracking are included so that information is used to control the output more quickly and directly than is possible by taking the long path around the loop.

A tracking system has the job of predicting in real time the parametric behavior of radar signals to be jammed, future threat events (radar pulses, sonar pulses, etc.) By knowing when a pulse will arrive before it actually does, data from the pulse echo can be obscured (jammed) so as to reduce either the threat of detection or the accuracy of the resulting detection information. The term "tracking" has to do with occasionally taking a look at the signal so prediction errors can be corrected. The result is that the prediction adjusts its signal model as the signal changes. Hence the predictions "track" the signal.

Parameters to be predicted include the time of arrival (TOA), the radio frequency (RF), the amplitude. and the angle of arrival (AOA) of each pulse from a radar emitter. The time of arrival depends upon the pulse repetition interval (PRI), which is also referred to by the pulse repetition frequency (PRF). A *stable* signal is one for which the pulse repetition interval and other parameters are the same from pulse to pulse. A *stagger* signal is one for which the pulse repetition interval changes either from pulse to pulse or with some other cyclically repeating pattern. An *agile* signal is one for which other parameters such as frequency or amplitude change with a cyclically repeating pattern.

Very high speed integrated circuit (VHSIC) technology should make it possible to improve many characteristcs of signal processing systems. It would be highly desirable to develop a programmable interconnection scheme which permits processes to communicate without rigid restrictions. The prior art system structure required special trackers, special purpose presorters, special purpose waveform generators, video processors and the like.

An object of the invention is to provide a unit which can be integrated into a fully programmable system as opposed to a rigid system with varying degrees of programmability at the module level. A further object is to provide a programmable preprocessor which would allow a common hardware design to be used for a wide variety of preprocessing functions. The advantages include an increase in flexibility and a substantial reduction in overall life cycle cost for the system due to the use of a standardized hardware design.

The back end general purpose processing has been the subject of extensive work aimed at standardization and miniaturization. More recently, the middle ground of programmable vector signal processors has been subjected to similar efforts to reduce size and introduce programming standards. Certainly, the idea of building signal processors which are functionally modular, which are built from a small set of elemental module types and which are made to perform completely different tasks by programming is not new for either computers or signal processors. However, at the front end of a power management system, a sizable portion of the digital processing hardware is contained and little or no prior work has been done to apply the same principles used in the back end processing.

An object is to categorize the front end tasks by precision, dynamic range, memory capacity and speed requirements and then design a common processing module to solve all problems which have similar requirements.

It is clear that tracking and waveform generation have great similarity. They are both essentially signal models. With feedback, they are called trackers. Without it, they are just open loop signal generators. In prior systems, the two functions are usually performed by different special purpose processors.

U.S. patents of interest include U.S. Pat. No. 4,217,580 to Lowenschuss, which discloses an electronic contermeasure system for automatically identifying radio frequency energy sources and assigning countermeasures to such sources when required. The electronic countermeasure system includes signal processing apparatus which enables only a predetermined number of digital words associated with one of a plurality of radio frequency energy sources to pass to a general purpose digital computer. U.S. Pat. No. 4,025,920 to Reitboeck et al discloses a radar system which includes signal processing equipment for identifying radar signals from selected ones of their parameters such as azimuth, frequency, pulse duration and the like. U.S. Pat. Nos. 4,209,835 to Guadagnolo; 3,943,5I5 to Miley; and 3,764,999 to Simons et al disclose electronic countermeasure systems which use computer processing apparatus and are of general interest.

SUMMARY OF THE INVENTION

The invention relates to preprocessing or tracking apparatus, using multi-processor modules for predicting in real time the parametric behavior of radar signals to be jammed.

The apparatus according to the invention is intended to be part of an electronic countermeasures system which has as a minimum a system central processing unit (CPU) functioning as an executive, a receiver and its manager, and a transmitter and its manager. The actual architecture of the system is relatively unimportant so long as the tracker is provided with the required input/output (I/O) and data.

The tracker system has been partitioned into three board (module) types:

Subsystem Request Handler, which transfers data from system buses to the tracker system.

Multi-Processor Module, which does the actual track operation yielding the prediction data.

Vector Buffer Module, which transfers the completed prediction data onto the buses for the receiver and transmitter.

Tracker system expansion can easily be done by the addition of more Multi-Processor Modules. In the described embodiment, the tracker system can have up to four of these modules. This provides tracking for more than 200 signals. Expansion beyond this is quite easily accomplished by expanding the size of the internal bus so more modules can be addressed.

DETAILED DESCRIPTION

Power management systems for ECM (Electronic CounterMeasures) systems require that arrival time of any particular pulse of a given threat in a given environment be known in advance so that techniques can be applied to the pulse at the time of its arrival. This, of course, means that somewhere in the ECM system there must be a block whose function is to predict the time of arrival for every pulse of every identified threat's pulse train. For this disclosure, that block is identified as a tracker. The subject invention details a method of implementing a tracker in a parallel fashion.

Figure 1:
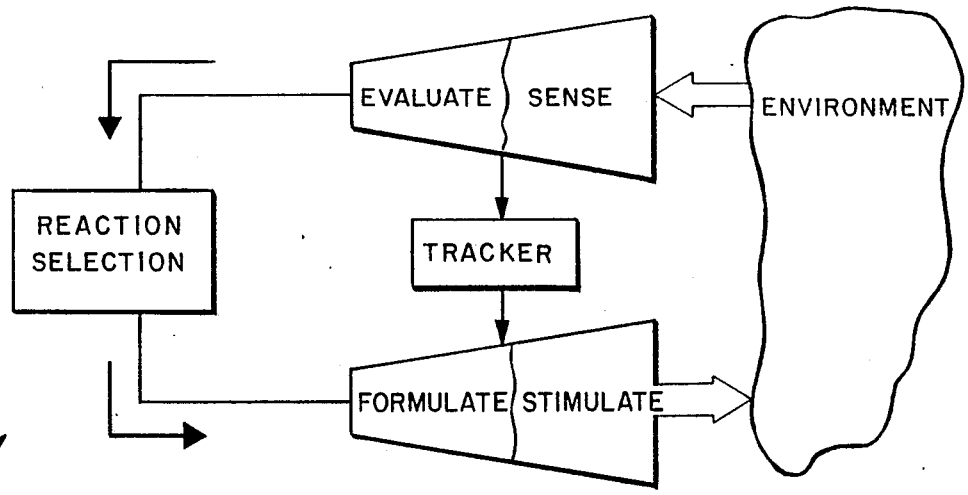
Fig. 1 PRIOR ART
FIG. 1 is a symbolic system block diagram of the architecture of typical prior art technology for power management in an electronic countermeasures system.

FIG. 1 shows a typical ECM system including a tracker. Before the tracker can perform its function, it requires that both the threats to be tracked and the parameters of those threats to be identified. This responsibility resides in a system computer which samples the environment and performs the identification. The system computer then transfers to the tracker the necessary parameter information (latest time of arrival, threat type [stable, stagger, agile, etc.]. angle of arrival, etc.) and initiates a track loop. By initiating the track loop, the system computer has off-loaded the tracking task and is free to perform its other system tasks, leaving the tracker to operate independently.

Once initiated, the track loop is required to provide updated predictions for each parameter being tracked on a pulse-to-pulse basis. The tracker is then required to provide these predictions to the system transmitter for countermeasures. The transmitter thus has a lower duty cycle because it turns on only in response to a pulse arrival: hence, the term "power management".

The tracker, however, cannot run continuously in this open loop manner (each prediction dependent on the previous prediction) because of the accumulation of error. For this reason, the tracker must gain access to the system receiver to examine the environment occasionally. At these times, the transmitter is turned off and the receiver records the actual pulse parameters. The receiver returns the errors between the predicted and actual parameters to the tracker for loop adjustment. This results in a closed loop track. By occasionally and randomly interspersing a few closed loops among the much larger number of open loops. the tracker is able to maintain the accuracy of its predictions while also providing the maximum amount of countermeasure capability.

Figure 2:
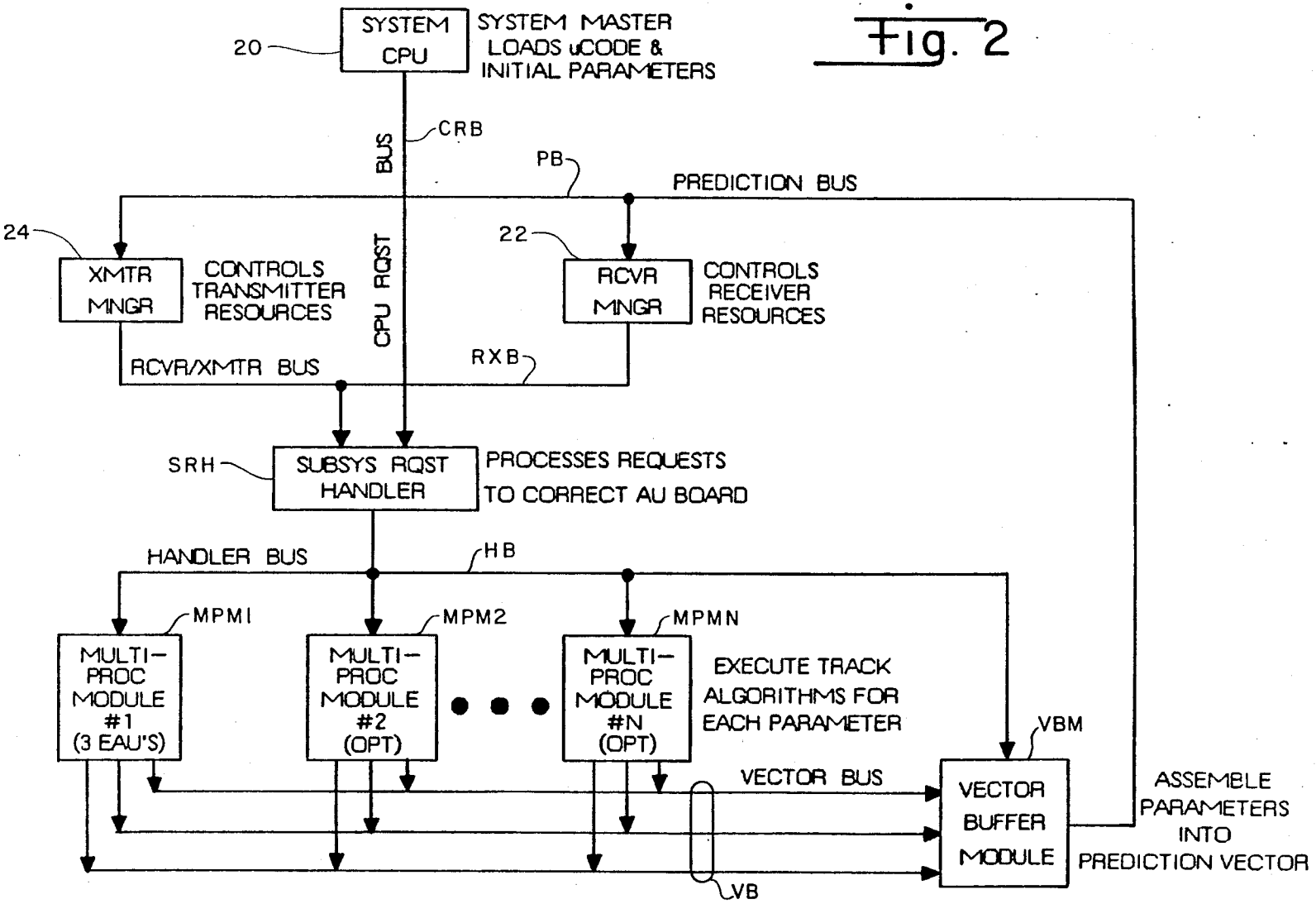
FIG. 2 is a block diagram of a tracker system according to the invention.

Thus, the tracker system has some clearly defined functions to perform, but it is not entirely independent of the surrounding system. This specification describes the internal implementation of a tracker in hardware as shown in FIG. 2, such that it can be inserted into any system having a central processing unit 20 which provides the necessary system access and data: start-up data and access to receiver and transmitter resource managers 22 and 24.

This invention relates to a modular, multi-processor signal tracking system comprising a subsystem request handler SRH, one or more multi-processor modules MPMl–MPMN, and a vector buffer module VBM. The subsystem request handler SRH is coupled to receive information from the system processor 20 via a CPU request bus CRB, and from the receiver and transmitter managers 22 and 24 via a receiver/transmitter bus RXB. A handler bus HB couples the request handler SRH to the modules MPMl–MPMN and VBM. A vector bus VB couples the multi-processor modules MPMl–MPMN to the vector buffer module VBM. A prediction bus PB couples the vecotor buffer module VBM to the receiver and transmitter managers 22 and 24. In the description that follows, each of the above components in the system will be discussed.

CPU Request Bus CRB

The tracker system is controlled by the CPU 20 transferring vectors via the request bus CRB to the subsystem request handler SRH. These vectors are interpreted as having an address field and a data field.

The request handler SRH responds as required to complete the transfer. The protocol adopted for the bus CRB is not significant to the description of the tracker system.

Receiver/Transmitter Bus RXB

The bus RXB is driven by the receiver and transmitter units 22 and 24. The purpose of this bus is to transfer the responses of these units back to the tracker system. The receiver uses both the ID/address and error/data portion because of the signal measurements it is required to make. The transmitter response uses only the ID/address portion of the data on the bus RXB.

The data word sent via the bus RXB consists of 48 bits divided into two fields of error/data and ID/address. The formats are given below. The data transferred consists of a vector made up of:

16 bit address bus configured as

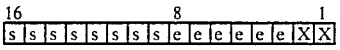

32 bit error measurement bus with fields as shown:

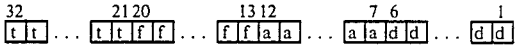

s . . . signal number tag field representing a number assigned by the CPU and carried throughout the tracker system as a tracer.

e . . . error flag bits—some assignments are:

1=Good direction data

2=Good amplitude data

3=Good frequency error data

4=Good time error data 5-6=Reserved

X . . . Unused t . . . 12 bit signed time error. Indicates error measured between predicted and observed pulse position.

f . . . 8 bit signed frequency error. Indicates error measured between predicted and observed pulse.

a . . . 6 bit measured amplitude of observed pulse.

d . . . 6 bit measured direction of observed pulse.

NOTE—The transmitter response will not use the data word and will set all error flag bits to the "bad data" state.

As far as the tracker system is concerned, the transfers by the receiver and transmitter may be interleaved for any number of signals, in any order.

The protocol adopted to allow sharing of this bus by the receiver and transmitter, and the method whereby the vector is transferred into the SRH is not significant to the description of the tracker system.

Subsystem Request Handler SRH

The function of the subsystem request handler SRH (shown in FIG. 3) is to merge, buffer and format incoming data from the bus CRB via a system interface circuit 30 and from the bus RXB via first-in-first-out prediction request unit 31; then, using the handler bus HB via address and data bus drivers 37 and 38, distribute this data to the multiprocessor modules MPMl-MPMN.

There are several simultaneous operations the request handler SRH can be doing. For the moment, consider an idle bus RXB and valid data on the bus CRB. The request handler SRH considers transfers by the CPU 20 to fall into three categories:

The data represents an address pointer.

The data represents a data value to be paired with an address pointer.

The transfer is to be ignored.

The system interface circuit 30 of the request handler SRH contains "name" circuits which allow the bus CRB to be shared with other users. In this case, a transfer which has the "wrong" name is simply understood as being directed to one of the other users: it is ignored.

If the transfer is meant for the tracker system and it is an address pointer type, the data is stored in a holding register. No further action by the request handler SRH is required. If the transfer had been of the data type, the previously loaded address pointer would be paired with this data, and a CPRQST flag set via line 301 to a request handler controller 33 (i.e., a CPU vector is ready).

The address pointer for the CPU vector is examined. The destination for this vector can be either the request handler SRH or some other destination within the tracker system. If the destination is not the request handler SRH, the address and data fields are routed through a buffer to the handler bus HB - the vector is understood to be intended for one of the multi-processor modules.

The rate at which the CPU 20 transfers data to the request handler SRH is limited by how fast data can be transferred over the bus HB and into a parameter memory of the selected multiprocessor module. This speed is limited to three parameter memory cycle times. As the intention is to have a memory cycle last only one clock the CPU 20 is therefore limited to one transfer every three clocks.

The other destination for a CPU vector is the request handler SRH. In this case, the request handler responds by writing the data into the proper location within the request handler SRH itself.

When the decision has been made to track a signal, the CPU 20 assigns a signal number, board and block. The CPU 20 then must load the signal parameters into the assigned multi-processor module's (BOARD's) parameter memory within the section (BLOCK) already assigned to it. BOARD and BLOCK RAM (random access memory) units 34 and 35 located on the request handler module SRH must also be initialized.

The BOARD RAM 34 and BLOCK RAM 35 are used as table lookup devices to route responses from the bus RXB to the proper destination within the tracker system. Both RAMs are written at the same time. The address and data portions of the CPU vector have the format:

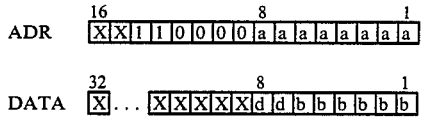

where a is the signal number being initialized in the RAMs.

d is the board number assigned to this signal.

b is the block number assigned to this signal.

With regard to how signals are assigned to tracker systems having more than one board, each of the multiprocessor modules has a limited amount of computing capacity (instructions per second, say), and each of the signals requires some number of instruction be executed per second if that signal is to be tracked. Therefore, assignment of a signal to a particular board must take into account current board loading and expected impact of that new assignment. Improper signal assignment can result in one of the boards being idle while another runs farther and farther behind because its workload is too great.

The allocation of resources in the tracking system is a management problem which has been deliberately left to the CPU 20. This assignment tends to be a time-consuming task, as well as requiring an overall evaluation of system capabilities. Now consider the request handle SRH and the bus RXB.

As indicated before, both the transmitter and receiver load vectors into the request handler SRH. Actually, these vectors are loaded into a FIFO buffer 31 (the prediction request FIFO) which acts as a queueing device for prediction requests waiting to be sent to the multi-processor modules. The format is given in the RXB section.

When a vector/request drops to the bottom of the FIFO to be serviced, it is processed as follows:

The signal number is translated by the board and block RAMs 34 and 35 and the result made available to the bus HB drivers 37 and 38 as well as the signal number itself.

An address word is composed for the HB drivers with the format:

| | 16 | | | | | | | | | | | | | | | 1 |
|---|---|---|---|---|---|---|---|---|---|---|---|---|---|---|---|---|
| ADR | b | b | k | k | k | k | k | k | s | s | s | s | s | s | s | s |

bb BOARD number
k BLOCK number where the signal track parameters are located
s Signal number assigned by the CPU 20.

The data word is made up of 32 bits loaded into the FIFO 31 from the bus RXB.

This completed vector is transferred to the bus HB.

When the request handler SRH transfers vectors to TASK FIFOs, it is possible for that FIFO to be full. As long as the request-handler FIFO buffer 31 isn't also full, the request handler SRH will wait for the transfer to complete. However, if the buffer is full, a CPU interrupt is generated, the transfer is aborted, and operation continues with the next transfer. In this way, only the board which is full loses data, other boards continue to track. When the full task FIFO becomes available, transfers again take place to that board.

From the above, it is clear that two users must gain access to the handler bus (HB): the CPU vector transferred over the bus CRB, and the request vector, just discussed. Without a conflict, the request vector is placed on the bus HB for transfer to one of the multi-processor modules. In cases of conflict between the two users, the CPU is given priority access to the bus HB.

Handler Bus

The handler bus HB distributes the address and data from the request handler SRH to all the multi-processor modules. The bus is 48 bits wide and apportioned 32 bits of data and 16 bits of address. Control signal consists of:

FIFO load mode flag if active, bus HB contains data for loading a task FIFO on the selected board. Otherwise, bus HB contains data for loading RAMs.

LOAD strobe. Indicates the bus HB has valid data for loading.

TASK full flag returned from the destination board.

The format for loading TASK FIFOs is given above. The remainder are shown below.

Multi-Processor Module (MPM)

Figure 4:
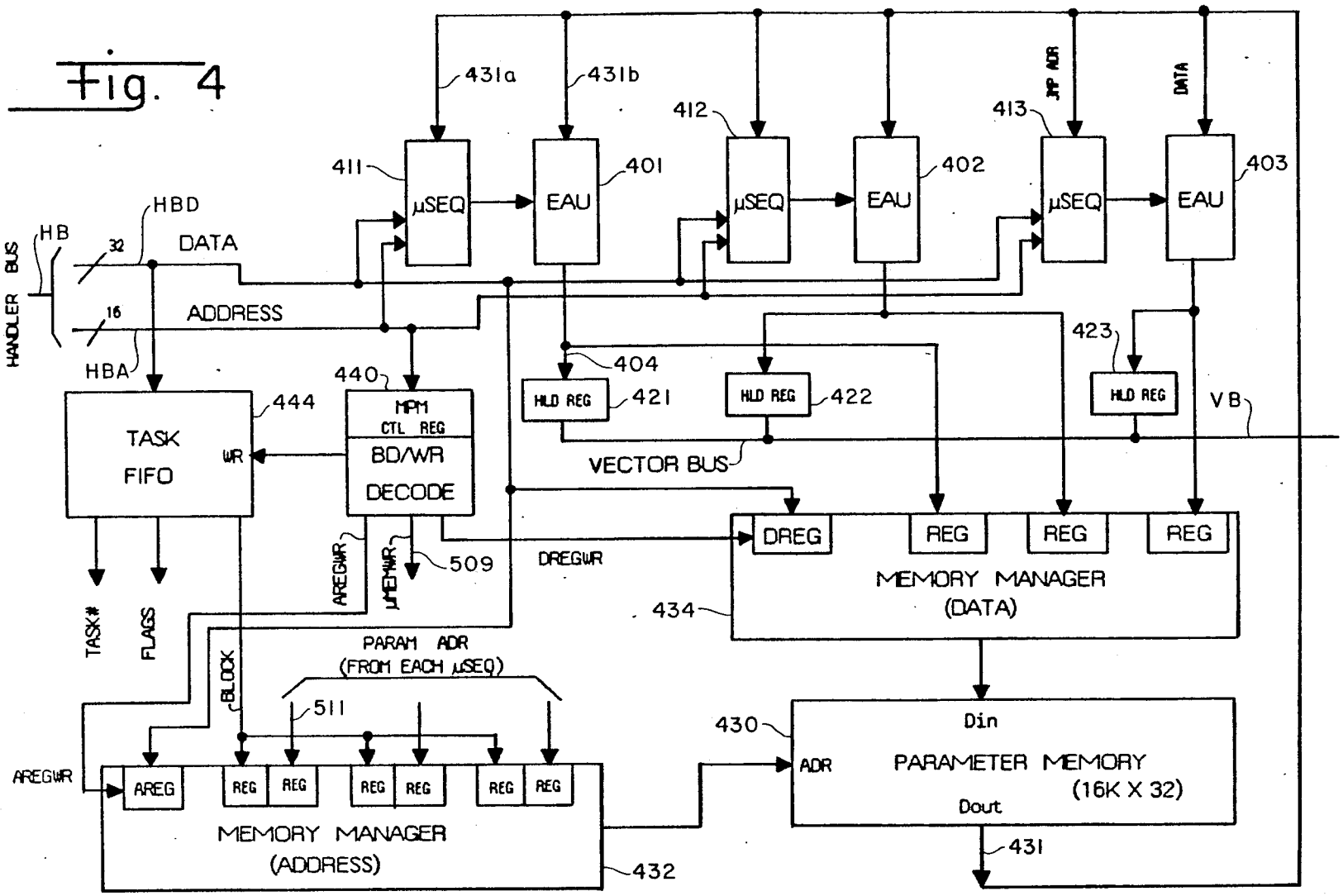
FIG. 4 is a block diagram of one multi-processor module of FIG. 2.

A block diagram of one of the multi-processor modules MPM1–MPMN is shown in FIG. 4. Each of these modules includes three extended arithmetic units (EAUs) 401, 402 and 403, with associated micro-sequencers 411, 412 and 413, and vector buffer bus hold registers 421, 422 and 423 respectively. Each has access to the parameter memory 430, with memory managers 432 and 434 for address and data respectively. There is also a MPM control register 440 with a board/write decode circuit 442, and a task FIFO register 444.

All data appearing on the bus HB is monitored by each of the multi-processor modules MPMl–MPMN in the tracker system. If the board number field within the address field matches that of a module, the data is routed to the appropriate place within that module.

There are seven places within a multi-processor module to which the data may be directed: the MPM control register 440, micro-code memories of the three micro-sequencers 411–413, an address register AREG of the memory manager 432 for loading the parameter memory, a data register DREG of the memory manager 434 for loading the parameter memory, and the task FIFO 444. The formats for these different places are:

| | 16 | | | | | | | | | | | | | | | 1 |
|---|---|---|---|---|---|---|---|---|---|---|---|---|---|---|---|---|
| ADR | b | b | 0 | 0 | X | X | X | X | X | X | X | X | X | X | X | X |

| | 32 | | | | 8 | | | | | | | | 1 |
|---|---|---|---|---|---|---|---|---|---|---|---|---|---|
| DATA | X | X | X | ... | X | X | d | d | d | d | d | d | d |

where
bb is the board number (0–3)
X unused bits
d is the 8-bit control word
ex bit 1=0 hold processor 1 cleared
2=0 hold processor 2 cleared
3=0 hold processor 3 cleared
4=0 enable address mux for loading
5=0 clear task FIFO
6=0 disable board name decode etc.

The ability to selectively hold a processor cleared is used during three major times;

During micro-code loading, all processors are held in the clear state.

During diagnostic tests, a selected processor can be checked without the others running.

Smooth system performance degradation. In the event of a processor problem, the defective processor can be locked out and the tracking done by the remaining processors.

During Micro-Code RAM initialization, all three RAMs on an MPM are loaded at the same time. However, by disabling the name decode on all the MPMs, the loading process is done an all MPMs in the system at once.

| | 16 | | | | | | | | | | | | | | | 1 |
|---|---|---|---|---|---|---|---|---|---|---|---|---|---|---|---|---|
| ADR | b | b | 0 | 0 | 1 | h | a | a | a | a | a | a | a | a | a | a |

| | 32 | | | | 8 | | | | | | | | 1 |
|---|---|---|---|---|---|---|---|---|---|---|---|---|---|
| DATA | d | d | d | ... | d | d | d | d | d | d | d | d | d |

where
bb is the board number (0–3)
h selects upper/lower half of 64-bit word for writing
a is the 10-bit address which directly addresses the 1K micro-code memory
d is the 32-bit data word.

| | 16 | | | | | | | | | | | | | | | 1 |
|---|---|---|---|---|---|---|---|---|---|---|---|---|---|---|---|---|
| ADR | b | b | 1 | 1 | X | X | X | s | s | s | s | s | s | s | s | s |

| | 32 | | | | 8 | | | | | | | | 1 | | |
|---|---|---|---|---|---|---|---|---|---|---|---|---|---|---|---|
| DATA | d | d | d | ... | X | X | a | a | a | ... | a | a | a |

where
bb is the board number (0–3)
s—8 bits indicating which of the signals is being processed.
a is the 16-bit address pattern used to load the parameter address resistor.
X—bits unused in this field.

| | 16 | | | | | | | | | | | | | | | 1 |
|---|---|---|---|---|---|---|---|---|---|---|---|---|---|---|---|---|
| ADR | b | b | 0 | 1 | 0 | X | X | X | s | s | s | s | s | s | s | s |

| | 32 | | | | 16 | | | | | | | | 1 | | |
|---|---|---|---|---|---|---|---|---|---|---|---|---|---|---|---|
| DATA | X | X | X | ... | X | X | a | a | a | ... | a | a | a |

where
bb is the board number (0–3)

X—Unused s—8 bits indicating which of the signals is being processed.

d is the 32-bit data pattern used to load the parameter data register.

Parameter Memory Allocations

Central to the operation of the trackers is the parameter memory 430, a 16K×32 bit RAM which is divided conceptually into two main parts: pattern and parameters. Thirty-two (32) different patterns are expected to be stored in a compacted format of four 8-bit pattern points per word. 256 points make up a complete pattern. Thus each pattern would require 64 addresses, or a total of 2048 words for all 32 patterns.

The parameter portion of the memory is subdivided into blocks. Each block is dedicated to a particular threat. The defining parameters for that threat are passed from the CPU 20 via the request handler SRH just before a tracker is started. They are always stored in the same offset locations relative to the starting address of the block. Thus, the block address (=block number) defines where in memory a threat is located. Therefore, any parameter for that threat can be located by simply concatenating the block number and offset values.

The approximate number of parameters which define a threat are:

| | |
|---|---|
| TIME | 17 |
| FREQUENCY | 15 |
| AMPLITUDE | 15 |
| DIRECTION | 15 |

Also stored as part of this parameter block will be a single formatted word consisting of four 8-bit addresses (one for each parameter of time, etc.) which are the processing sequencer's starting addresses for the type of calculation (stable, agile, stagger, etc.) to be run for that parameter. Also, space is reserved for 32 levels of time stagger and 32 of frequency stagger. The approximate amount of storage set aside for each threat is one hundred twenty-eight 32-bit words. Assuming 50 threats, yields about 8.5K (128×50) words taken up by parameters in the parameter memory 430. The remainder of the 16K words are available for constants and temporary use by the tracker processors.

Memory Manager

Notice on the block diagram that there are three arithmetic units 401–403 with their associated sequencers 411–413. These are the true tracker chip sets in that the sequencers run the prediction algorithms stored in their micro-code memories using data supplied to the arithmetic unit by the parameter memory 430. However, since the parameter memory is common to all three sets, any chip set can perform calculations for any threat. The drawback is that a common memory requires a memory manager (comprising units 432 and 434 as shown). This manager works to the following rules:

1. Every user makes a request for access (read/write)
2. Every user is granted access according to the time its request is made relative to other requests
3. If a user makes repeated requests and is the only requestor, it is given immediate access
4. A user making repeated requests is not given access if it had the previous access and there are other requestors
5. The longest any requestor must wait for access is 3 clocks (3 other requestors) and the minimum wait is zero clocks Whereas the three track processors 401–403 simply present data and address to the memory manager, the bus HB presents first the address then, later, data. Consider what happens during pattern initialization:

(Under command of the CPU . . . )

The request handler SRH (via the bus HB) writes the parameter memory 430 with the patterns by first writing the memory manager address register and then writing the memory manager data register. This generates a memory access request.

Task FIFO

Before a tracker is started, the CPU 20 writes the parameter memory 430 with the necessary defining information and then writes the task FIFO 444 with the first prediction request. From this point on the tracker is driven by the task FIFO 444.

As each request falls to the bottom of the FIFO 444 to be serviced, the FIFO valid data bit enables a Sequencer Priority Circuit (SPC, not shown). The three chip set busy flags are used by the SPC to determine which of the three chip sets is available to perform the calculations for this request. This determination is done on a fixed priority basis, that is, a chip set will be assigned only if the one ahead of it is busy. This means that one chip set may work considerably more than the others, but the request will always get the next available chip set. If all chip sets are busy, the request will wait until one of the chip sets becomes available.

A strobe associated with the first available chip set will load the FIFO data into that chip set's holding registers:

ERROR flags are loaded into a register where they may be tested individually by the micro-code programs.

ERROR data is loaded into one of the internal registers in the AU. The different fields can then be used as needed.

BLOCK NUMBER is loaded into a block holding register within the memory manager. (There is one register for each chip set)

SIGNAL NUMBER is loaded into the vector holding register so this number will accompany all prediction components on the vector bus.

The strobe that transfers data from the task FIFO 444 to the sequencer holding registers also toggles a busy/-clear flip-flop (not shown). With the flip-flop now in the busy state, the sequencer is released from the cleared state it was held in. The sequencer can now execute the instruction stored in address 0 (a jump to the fetch routine). This FF also doubles as the busy/done flag input to the Sequencer Priority Circuit SPC.

The fetch routine accesses the parameter memory 430 to retrieve the formatted parameter type word (the word containing the four entry addresses which the sequencer must do for this threat). The sequencer then begins the process of generating a prediction vector. This will always be in the sequence: time, frequency, amplitude, direction. As the sequencer runs each of these update routines, it reads whatever data it requires from the parameter memory 430 and writes whatever data must be updated for succeeding predictions.

As each parameter prediction is completed, it is loaded into the vector buffer bus holding register (hold register 421 for EAU 401) and a ready flag is set. The sequencer immediately proceeds to the next parameter. When the sequencer completes the final parameter prediction, it resets its busy flag by clearing the idle and is ready to accept another assignment.

Micro-Program Control

Figure 5:
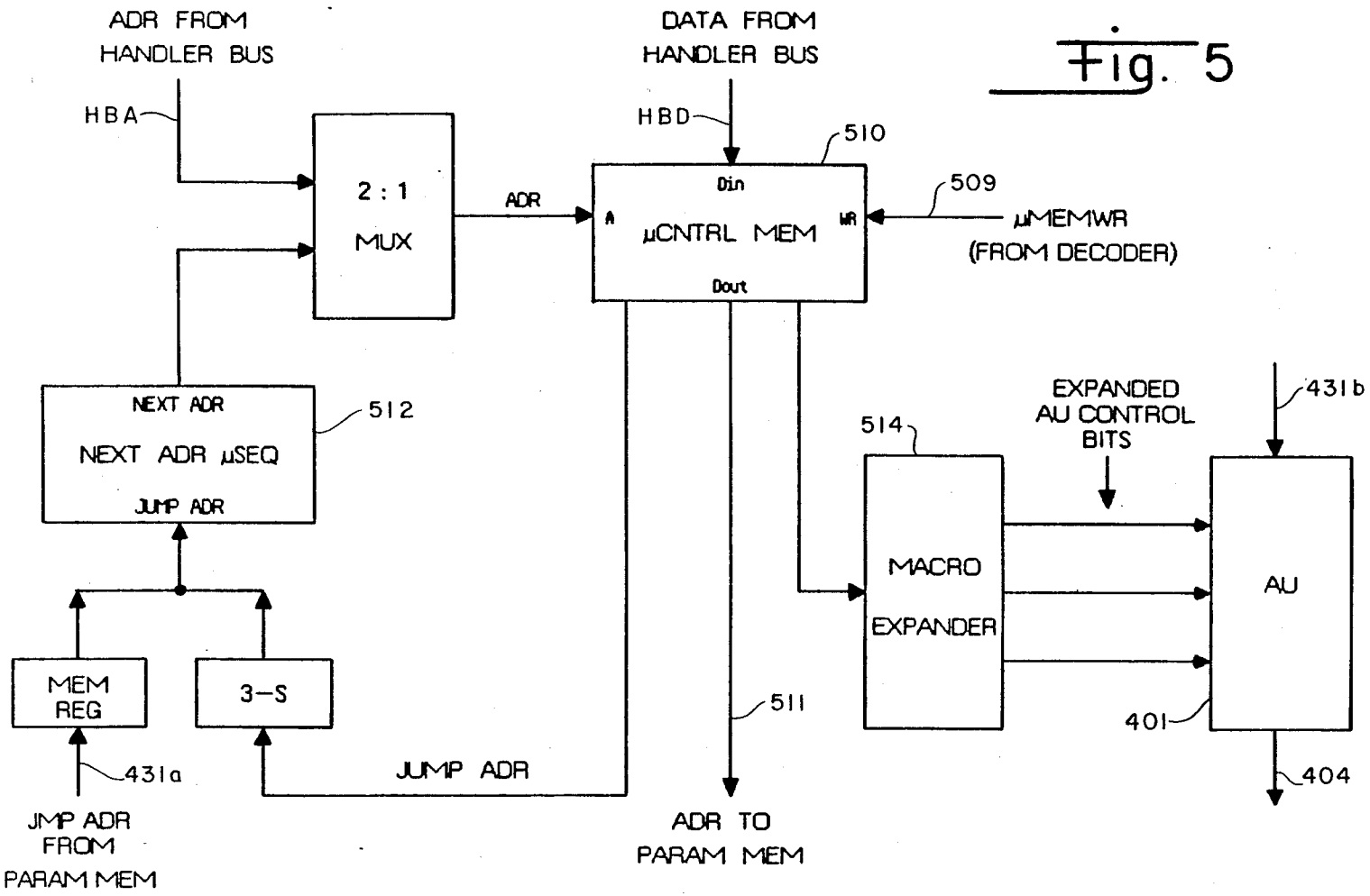
FIG. 5 is a block diagram of a microsequencer of the module of FIG. 4.

Each of the three processors 401–403 on the module of FIG. 4 have their own micro-program control circuitry 411–413 respectively. The micro-sequencer 411 is shown shown in FIG. 5. The main components are the micro-program RAM 510, sequencer 512, and the macro expander 514.

The micro-program RAM 510 is 1K word by 64 bits which contains the step-by-step instructions necessary to process the data. For clarity, the 64 bits are considered to be grouped into different fields. Each of these fields represents the control bits for one or more logic elements.

The sequencer 512 furnishes addresses to the micro-program RAM 510. In this way, the control words are fetched, one by one, and the processing accomplished. The algorithms require more than a simple linear scan through the RAM, however. Data and flags must be tested and, as a result of these tests, branching (jump to another address) or waiting may be required. One of the fields within each control word is a jump address. Thus, a step in the processing may require the sign of an argument be tested. Based upon the result, the sequence of steps taken can be altered.

A pause may be called for in the case of a busy flag being returned by the parameter memory manager 430. Here further processing must wait until the memory becomes available. Then the program can continue.

The macro expander 514 is a very useful tool in helping to reduce the length of the micro-control word and therefore, the number of memory packages in the RAM 510. The macro expander translates an encoded field within a control word into a decoded set of control bits. The application of this concept can be understood by the following analogy:

The addresses supplied to the micro-program RAM can be thought of as encoded control bits which the RAM translates into the control word.

Similarly, the macro expander is supplied with an encoded control field which is then translated into the control bits used to control data processing elements.

There are drawbacks which may, in some systems, outweigh the benefits. The primary concern is that of placing an additional delay in the control path. The decision must be made based upon physical and performance requirements imposed by the operating environment.

Vector Buffer Register

The vector buffer bus register 421 must wait until the vector bus VB is available before the transfer can be made. The register is allowed to drive the bus when the bus VB returns a REGEN signal in answer to the register's ready signal. Conflicts are resolved by a daisy chain system. When the register finally drives the bus VB, it supplies;

| | 10 | 8 | | | | | | | 1 |
|---|---|---|---|---|---|---|---|---|---|
| ADR | t | t | s | s | s | s | s | s | s |

-continued

| | 32 | | | | 8 | | | | | | | 1 |
|---|---|---|---|---|---|---|---|---|---|---|---|---|
| DATA | d | d | d | ... | d | d | d | d | d | d | d | d |

where t . . . is the type of word being transferred
e.g., 0=predicted TOA,
1=Frequency, etc.

s . . . is the signal number d . . . is the 32-bit data pattern.

Vector Bus (VB)

The vector bus is composed of three sets of 32-bit data buses and 10-bit address buses. The format of the data has already been given above.

This bus connects the vector buffer module VBM to the one or more multi-processor modules MPM1–MPMN. Each of these modules has three connections to the bus VB. The first tracker chip set connects to the first set of address and data lines, the second to the second, etc.

As the bus VB connects one multi-processor module to the next, the bus VB is twisted by one position at each board. This prevents the first chip set on all the boards (which has the highest workload) from being connected to the same position on the bus VB.

Vector Buffer Module (VBM)

Figure 6:
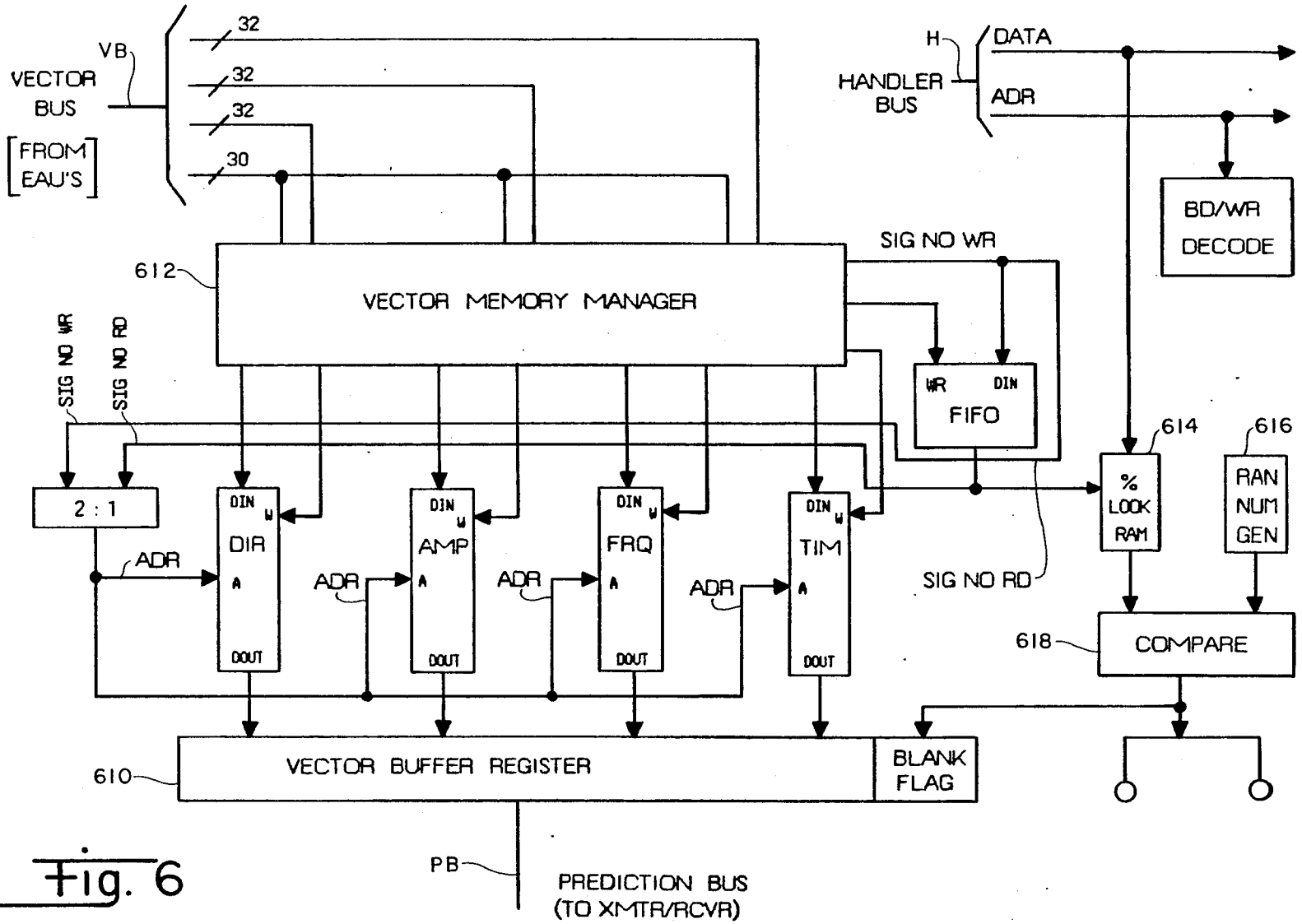
FIG. 6 is a block diagram of the vector buffer module of FIG. 2.

A block diagram of the vector buffer module VBM is shown in FIG. 6. The vector buffer board has two primary functions: (1) vector assembly, and (2) blanking control. Vector assembly is based on the fact that each threat has predictions for all of its parameters calculated by the same tracker chip set and each chip set will always do the calculations in the same sequence (with time always first). Also, there will be only one prediction at a time per threat because another request will not be made until the present prediction has been processed by either the XMTR controller or the receiver controller. Thus, the vector memory need only have as many slots as there are threats and is to be addressed by the system signal number assigned to the threat by the CPU.

The vector buffer module VBM uses a memory manager 612 because there are several users of a common memory. This memory manager 612 is very similar in concept to the one used on the multi-processor module (FIG.4). The VBM memory manager 612 adheres to the same general rules of operation and priority as the MPM memory manager 432, 434 but differs because it must also support the task of vector assembly.

On the multi-processor module as each tracker chip set completes prediction calculation for a parameter and loads it into a holding register, a ready line associated with that register goes active. The ready flag daisy chains through any intervening ones of the multi-processor modules MPM1–MPMN and arrives at the vector buffer module VBM. The vector buffer recognizes the request, sends back a REGEN which turns on the holding register.

The incoming bus VB contains the data and the address associated with that data. The address portion contains the signal number and a type number identifying the parameter on the data bus. The memory manager 612 uses the type number to select the segment of the vector memory into which the data is to be stored and uses the signal number to identify which slot of that segment is to be filled. The memory manager 612 also examines the type number for the end of the parameter prediction sequence. Since the trackers always do the parameters in the same sequence, the occurrence of this type number at any time indicates that all of the parameters of the vector for that signal number have been loaded into the vector memory; i.e., a prediction vector has been assembled.

Once a vector has been assembled, its signal number is entered into a FIFO. As these signal numbers fall to the bottom of the FIFO they are used to address the segments of the vector memory so that their contents are loaded into the buffer register 610 as one word. Additionally, the signal number from the FIFO is used to address a memory 614 which stores the blanking percentage for that signal. This blanking number is compared in a circuit 618 with the output of a random number generator 616 to determine if a window is to be opened. If the result of this test is positive the vector is placed on the prediction bus and directed to the receiver. Otherwise, the vector will be sent to the transmitter.

Initialization of the memory 614 containing the blanking percentages (LOOK RAM) is done by the CPU 20 through the request handler SRH and handler bus HB interfaces. Loading the RAM 614 is done when the board number of the vector appearing on the bus HB matches that of the vector buffer module VBM. When a match is detected, the address and data sources for the LOOK RAM are changed to the bus HB, the data is written, and the address path is returned to normal. The format of data for the vector buffer module VBM is:

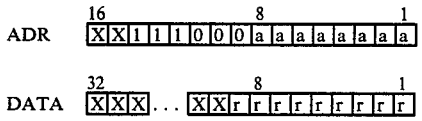

where

XX—Unused bits a—Signal number used as address for LOOK RAM r—Transmitter blanking proportion value, i.e., the percentage of time the receiver can be used (rrr . . . =percent use times 256−1).

Conflicts between the CPU 20 initialization and FIFO access are resolved by delaying the FIFO access until the CPU has finished its write cycle.

Prediction Bus (PB)

The prediction bus PB is driven by the vector buffer module VBM and transfers the prediction data from the tracker system to the ECM system receiver or transmitter. The protocol involved in transferring data over this bus is not significant to the description of the tracker system.

Tracker System Characteristics Summary

Typical Operation

Power On

The CPU begins the initialization by downloading the micro-code for the multi-processor modules. Patterns are stored in the parameter memories.

Tracker Assignment

The CPU downloads data to the SRH BLOCK and BOARD RAMS, defines the threat in the selected board parameter memory, the VBM LOOK RAM.

Finally, the CPU loads the task FIFO on the selected board with a prediction request.

Tracker DE-assignment

The CPU rewrites the TYPE WORD (first word in the block) for the selected signal to be no-op. The next prediction will never be done. The signal is no longer being tracked.

HIERARCHICAL MULTIPROCESSOR SYSTEM WITH VHSIC TECHNOLOGY

A Hierarchical Multiprocessor System (HMS) is described in a co-pending patent application Ser. No. 872,737, filed June 10, 1986, by R. F. Webb for a "Complex Arithmetic Vector Processor", which is hereby incorporated by reference. The system is also described in an unpublished report titled "Very High Speed Integrated Circuits (VHSIC)—Phase 1—CDRL Item No. 23—Advanced Power Management System (APMS)/VHSIC Analysis", under a contract with the Department of the Air Force. A copy of chapters 3 and 6 and appendix A of the report is included as part of the original file of this patent application.

Figure 7:
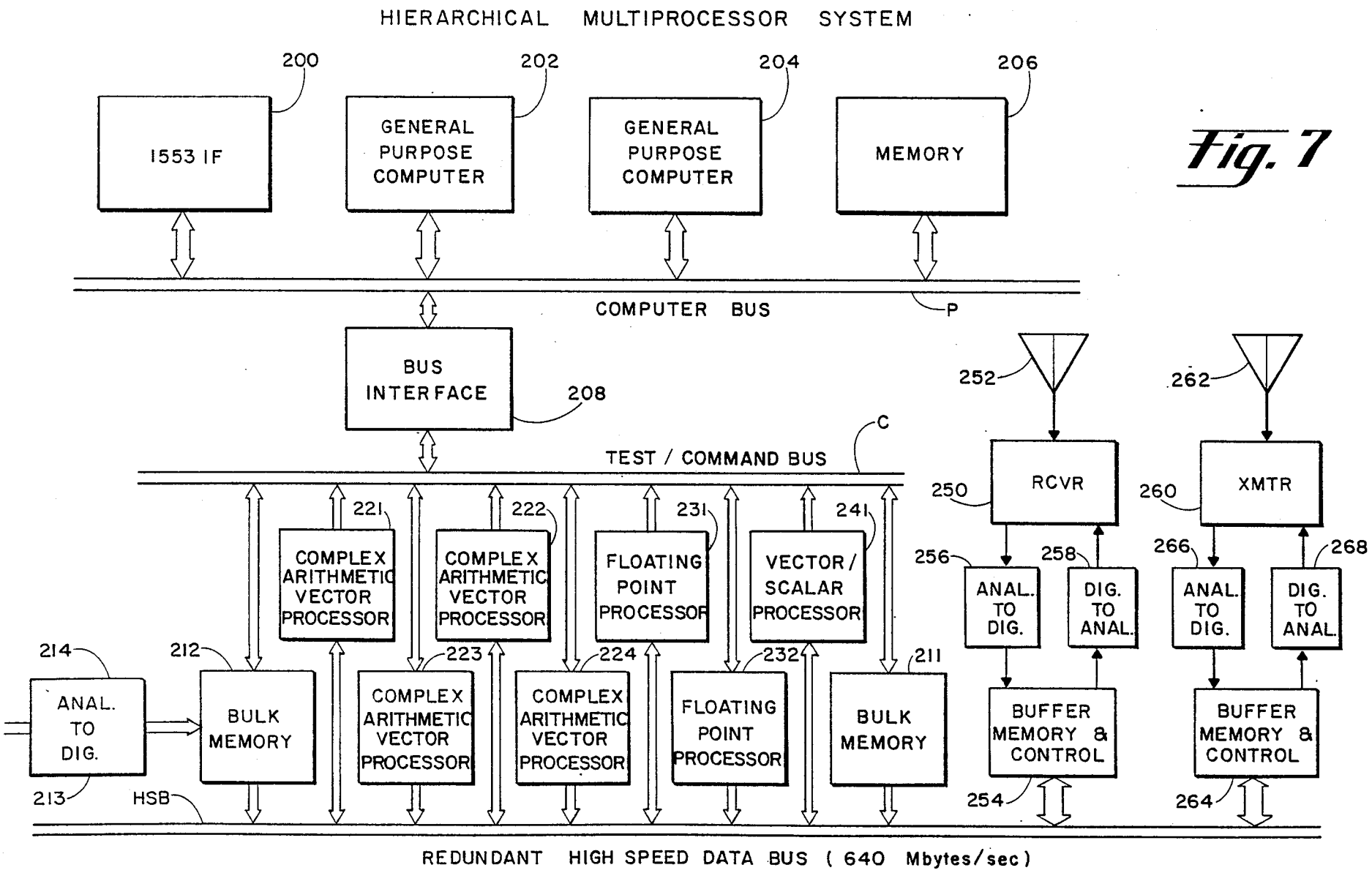
FIG. 7 is a block diagram of a hierarchical Multiprocessor System.

The HMS system architecture shown in FIG. 7 has a plurality of processor modules 221–241. The circuits for all of the modules are fabricated from a chip set comprising a small number of types of very high speed integrated circuit (VHSIC) chips, including a controller chip which has an embedded computer, an arithmetic unit chip, a memory chip, and a gate array chip. The system includes a system CPU which functions as an executive, a receiver 250, and a transmitter 260, with digital circuits interconnected by a test/command bus C and high-speed data buses HSB. The system CPU comprises at least one general purpose processor 202 and other circuits interconnected via a computer bus p, which is coupled to the bus C via an interface unit 208.

One or more of the modules (such as module 224) of the system may be a tracker, using the chips described in the Webb patent application. If the apparatus of FIG. 2 were used in the system of FIG. 7, the system CPU 20 would be provided by the units interconnected by the bus p, the bus CRB would be provided by bus C, the buses PB and RXB would be provided in the set of buses HSB, the receiver manager 22 would be the unit 254, and the transmitter manager 24 would be the unit 264.

Figure 3:
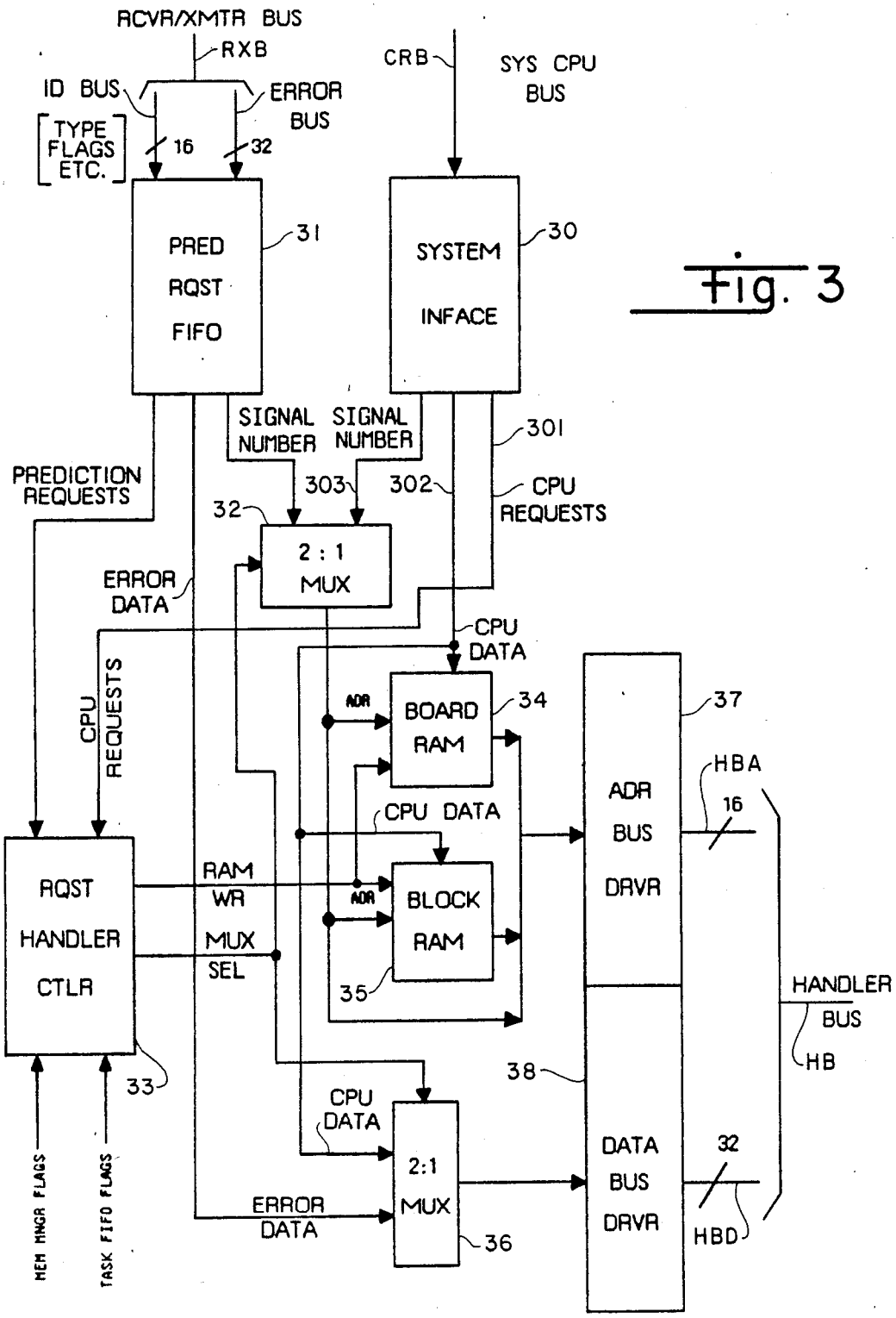
FIG. 3 is a block diagram of a request handler subsystem of FIG. 2.

In said report, chapter 6, particularly section 6.2, includes material derived from our disclosure, the tracker controller of report FIG. 6-3 being an earlier version of the subsystem request handler shown as FIG. 3 herein, and the tracker processor organization of FIG. 6-4 of the report being the multiprocessor module block diagram shown as FIG. 4 herein.

Figure 8:
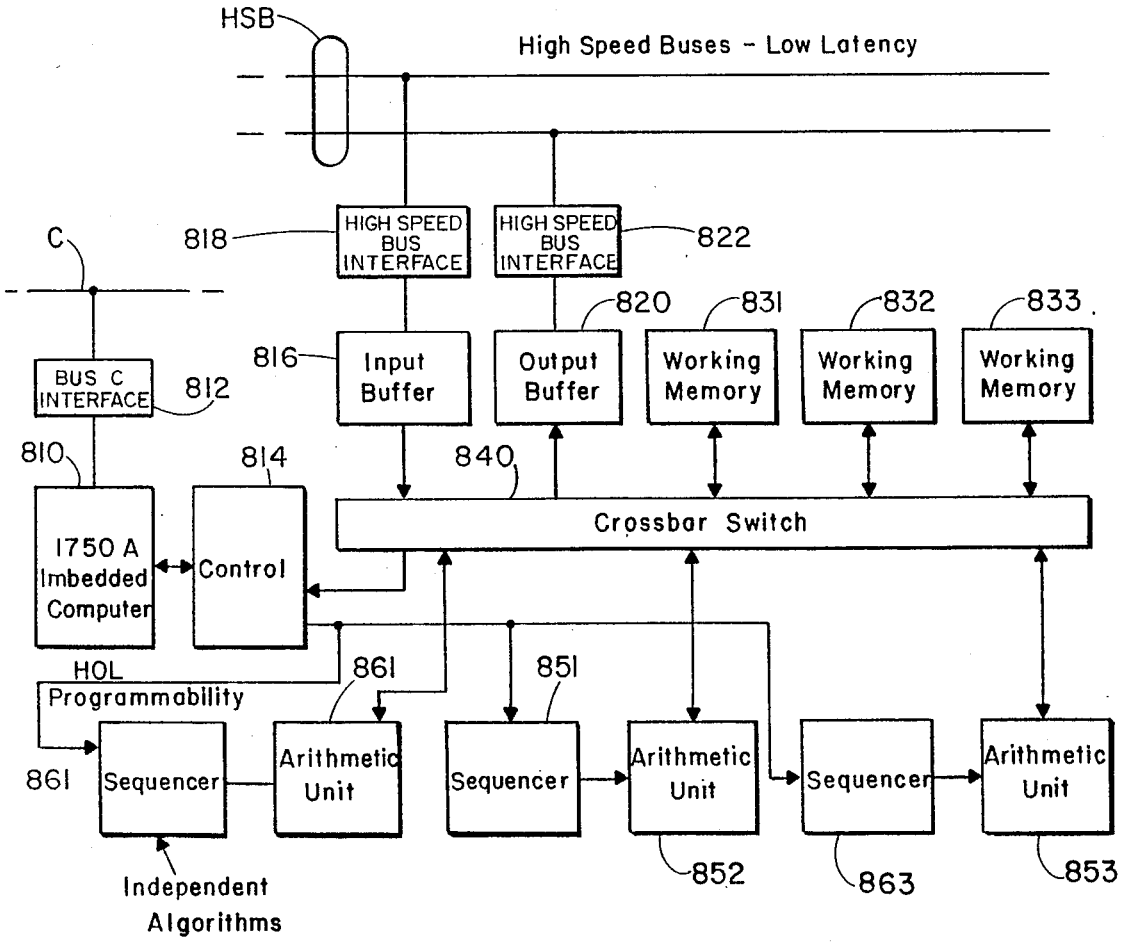
FIG. 8 is a functional block diagram of a preprocessor module architecture for use in the system of FIG. 8.

The report also includes a FIG. 6-1 described in section 6.1, Preprocessor Module Architecture, shown herein as FIG. 8, which is an alternative embodiment to the tracker organization shown in FIGS. 2–6. The preprocessor of FIG. 8 may be the tracker 224 of FIG. 7, coupled between the bus C and the set of data buses HSB. This embodiment includes a crossbar switch 840. An input buffer 816 with its bus interface 818 provides the function of the prediction request FIFO 31, and a bus interface unit 812 corresponds to the system interface 30. A tracker controller comprising a 1750A embedded computer 810 with a control unit 814 provides the other functions of the subsystem request handler SRH. There are arithmetic units 851–853 with sequencers 861–863 which correspond to the units 401–403 and sequencers 411–413. The parameter memory 430 is provided by three working memories 831–833. The vector buffer module VBM is provided by an output buffer 822 and its bus interface 822.

It is understood that certain modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

What is claimed is:

1. A preprocessor unit for use in a multiprocessor system having bus means, for processing data from a plurality of sources, said preprocessor unit comprising:

control means used as a subsystem request handler, including an input buffer and a system interface, which provides means for inputting address and data information from the bus means, when the address information includes a "name" designating said preprocessor unit;

processing means including parameter memory means and arithmetic means, the arithmetic means comprising a plurality of chip sets, each chip set comprising an arithmetic unit and a microsequencer individually associated with that arithmetic unit, providing each arithmetic unit with its own independent microcontrol memory and controller, so that job timing and microprogram sequencing is independent for each arithmetic unit;

and an output buffer used as a vector buffer, which provides means for outputting processed data onto the bus means;

internal coupling means for coupling addresses and data from said control means to each of the microsequencers and the parameter memory means, for coupling data from the parameter memory means to each of the arithmetic units, from each of the arithmetic units to the parameter memory means, and from the arithmetic units to the output buffer;

the parameter memory means being subdivided into blocks, said control means having microcode for designating a block of memory for a particular source, designating addresses for storing each of a plurality of parameters at a particular location in the block used for that source at an offset location relative to a starting location of the block.

* * * * *